US010184553B2

(12) United States Patent
Kwiatkowski et al.

(10) Patent No.: US 10,184,553 B2
(45) Date of Patent: Jan. 22, 2019

(54) BLAST MITIGATING DIFFERENTIAL HOUSING

(71) Applicant: Pratt & Miller Engineering and Fabrication, Inc., New Hudson, MI (US)

(72) Inventors: Kevin R. Kwiatkowski, Ann Arbor, MI (US); Benjamin J. Wright, Wixom, MI (US); James R. Fries, Fenton, MI (US); Richard R. Reichenbach, III, Ferndale, MI (US); Chantelle M. Korson, Berkley, MI (US); Celyn M. Evans, Milford, MI (US)

(73) Assignees: PRATT & MILLER ENGINEERING AND FABRICATION, INC., New Hudson, MI (US); THE UNITED STATES OF AMERICA, AS REPRESENTED BY THE SECRETARY OF THE ARMY, Washington, DC (US)

(*) Notice: Subject to any disclaimer, the term of this patent is extended or adjusted under 35 U.S.C. 154(b) by 133 days.

(21) Appl. No.: 14/621,342

(22) Filed: Feb. 12, 2015

(65) Prior Publication Data

US 2016/0265646 A1 Sep. 15, 2016

Related U.S. Application Data

(60) Provisional application No. 61/938,995, filed on Feb. 12, 2014.

(51) Int. Cl.
*F41H 7/04* (2006.01)
*F16H 57/037* (2012.01)
(Continued)

(52) U.S. Cl.
CPC ......... *F16H 57/037* (2013.01); *F16H 57/025* (2013.01); *F41H 7/042* (2013.01); *F16H 2057/02052* (2013.01)

(58) Field of Classification Search
CPC ................. F16H 57/037; F16H 57/025; F16H 2057/02052; F41H 7/04; B64D 45/0015
(Continued)

(56) References Cited

U.S. PATENT DOCUMENTS 4,174,653 A * 11/1979 Appelblatt ................ F41H 7/02
280/851
4,242,951 A * 1/1981 Bemiss .............. B60H 1/00414
454/146
(Continued)

FOREIGN PATENT DOCUMENTS

WO WO-2010128297 A1 11/2010

*Primary Examiner* — Michael D David
(74) *Attorney, Agent, or Firm* — Brinks Gilson & Lione

(57) ABSTRACT

In one embodiment, there is disclosed a blast mitigating differential housing for a vehicle, comprised of a first wall and a second wall in opposed spaced apart relation to each other. The first and second walls are separated by first and second side walls extending there between to define an inner space and an exterior surface. The side walls may be declined toward each other in a V shape. One of the first and second walls is equipped with an aperture to accommodate a vehicle drive line. The side walls are equipped with opposed apertures to accommodate the drive shafts and/or vehicle axles. The side walls may be further equipped with mounting structures along the exterior to accommodate a vehicle suspension system and/or steering elements. The inner space defined by the walls has a surface equipped for at least one vehicle differential mount.

6 Claims, 4 Drawing Sheets

(51) Int. Cl.
*F16H 57/025* (2012.01)
*F16H 57/02* (2012.01)

(58) Field of Classification Search
USPC ............ 89/36.02, 36.07–36.09, 36.11, 36.12
See application file for complete search history.

(56) References Cited

U.S. PATENT DOCUMENTS

| | | | | |
|---|---|---|---|---|
| 4,280,393 A * | 7/1981 | Giraud | ...................... | F41H 7/02 296/187.07 |
| 4,492,282 A * | 1/1985 | Appelblatt | ......... | B62D 49/0621 180/68.1 |
| 5,663,520 A * | 9/1997 | Ladika | .................... | F41H 5/226 296/187.07 |
| 5,727,496 A * | 3/1998 | Welch, Jr. | ................. | B63B 3/13 114/312 |
| 5,747,721 A * | 5/1998 | Speakes | ................... | B64D 7/00 244/121 |
| 5,866,839 A * | 2/1999 | Ohayon | .................... | F41H 5/02 89/36.02 |
| 5,905,225 A * | 5/1999 | Joynt | ....................... | B63B 3/10 89/36.02 |
| 6,435,071 B1 * | 8/2002 | Campbell | ................ | B60G 3/18 180/41 |
| 6,658,984 B2 * | 12/2003 | Zonak | .................... | F41H 7/042 296/193.07 |
| 6,779,431 B2 * | 8/2004 | Honlinger | ............... | F41H 7/042 296/193.07 |
| 7,032,928 B2 * | 4/2006 | Ridge | .................... | B62D 21/02 280/781 |
| 7,225,718 B1 * | 6/2007 | Grove | .................... | F41H 5/266 89/36.07 |
| 7,228,927 B2 * | 6/2007 | Hass | ........................ | B60K 6/46 180/65.25 |
| 8,402,878 B2 | 3/2013 | Schreiner et al. | | |
| 8,641,133 B1 * | 2/2014 | Scaringe | ............. | B62D 23/005 296/193.03 |
| 2007/0084337 A1 * | 4/2007 | Strassgurtl | ............. | F41H 7/042 89/36.08 |
| 2007/0234896 A1 * | 10/2007 | Joynt | ..................... | F41H 7/042 89/36.09 |
| 2008/0034953 A1 * | 2/2008 | Barbe | ..................... | F41H 7/042 89/36.01 |
| 2008/0066613 A1 * | 3/2008 | Mills | ...................... | F41H 7/042 89/36.09 |
| 2008/0173167 A1 * | 7/2008 | Mills | ...................... | F41H 7/042 89/36.02 |
| 2011/0079978 A1 | 4/2011 | Schreiner et al. | | |

\* cited by examiner

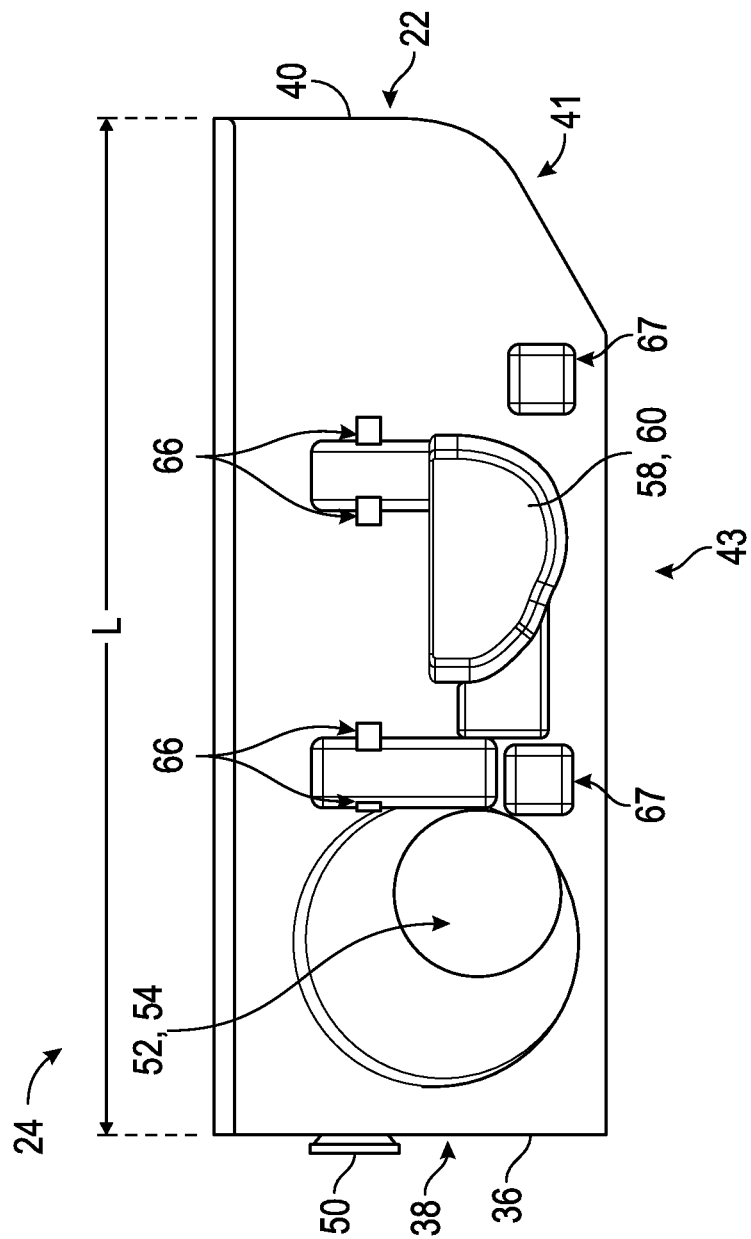

BLAST MITIGATING DIFFERENTIAL HOUSING

CROSS-REFERENCE TO RELATED APPLICATION

This application claims priority to provisional patent application No. 61/938,995 filed on Feb. 12, 2014, which is hereby incorporated by reference in its entirety.

STATEMENT REGARDING FEDERALLY SPONSORED RESEARCH OR DEVELOPMENT

This disclosure was made in part with U.S. Government support under contract number W56HZV13CO375. The U.S. Government has certain rights in the disclosure.

BACKGROUND

Asymmetric warfare is among the most difficult combat situations for any conventional military force. Military vehicles, such as patrol vehicles or troop transports, are prone to vehicle damage and crew or troop losses when exposed to explosions from improvised explosive devices (IEDs), mines or other explosive devices. Such explosions impact the bottom of a vehicle body, and can inflict pressure changes within the vehicle compartment that disable or kill troops or vehicle operators, or so damage the vehicle that it is no longer useable without extensive repair. Further, the vehicle can be forced into the air from the force of the explosion, and may roll over or injure troops/operators when it lands.

The nature of asymmetric warfare is such that with minimal expense, such as the expense for an IED or mine, an irregular or guerilla force or insurgency can disable very expensive military equipment, and inflict disproportionate casualties on a conventional military force. Mounting losses of this nature are one of the key objectives of such irregular guerilla groups, with the result of forcing a much larger conventional military force to withdraw simply because of the asymmetric losses of money, personnel and equipment.

In response to this type of combat, military vehicles have been developed which have blast mitigation properties, such that vehicle, crew and troop losses can be reduced. Undersides of military vehicles have been designed with shaped hulls to mitigate explosive forces by directing the force of the explosion around the vehicle hull, rather than present a flat or cluttered surface which permits pressure waves from an explosive force (i.e., blast energy) to accumulate on. Moreover, external shields have been placed over components to protect them from blasts, but these solutions are not integrated with the vehicle, they do not provide a "clean" space on a vehicle's underside, and compromise a vehicle's ride height clearance. However, these solutions have not been entirely satisfactory as the increased weight, costs and complexity make use of the vehicle, and field service of such vehicles, difficult. Moreover, equipment clutter in the underside of the vehicle is still an issue.

There is a continuing need for improvements in the blast profile of vehicles, especially vehicle undersides to deflect blast forces without injuring the operators or troops transported, and without subjecting vehicle components, such as drive differentials, to damage resulting from the blast.

There is further a continuing need to develop an improved blast mitigating housing without increasing the weight of a vehicle.

SUMMARY

Military vehicles are used, in large part, to transport troops and patrol districts in combat situations. There has been a problem is the design of such military vehicles that the blast mitigating design aspects have not been entirely successful at protecting the entire vehicle, especially the drive train. One aspect of the drive train that has, in the past, proved problematic, is the vehicle differential. In the past, the military has used "commercial off the shelf" (COTS) drivetrain differentials, which are large and bulky, and when installed in the bottom of a vehicle create a lot of exposed area for blast, as well as large flat areas parallel to the ground. In addition, equipment clutter, such as attachments for a vehicle's suspension, are not completely protected. When exposed to the blast force of an explosive from the ground, the large flat areas and the areas around the differential are especially prone to damage or provide such an area to cause the vehicle to leave the ground and even to roll over. Indeed, large, exposed areas and large flat areas parallel to the ground have proven problematic in vehicle design and invariably degrade blast performance of the vehicle.

To address one aspect of this problem, it has been determined that vehicle differentials should be placed higher in the vehicle, but this creates other problems in other vehicle packaging area as well as making the operational placement of the differentials difficult. The present disclosure discloses solutions that allow placement of the differentials in the vehicle that addresses packaging concerns, takes minimal space, and improves vehicle blast performance.

In one embodiment, the disclosure relates to a custom shaped differential housing that is shaped to mitigate blast energy being transmitted to the vehicle, and can use COTS differential internal components. These COTS components are removed from their housing, and repackaged and bolted inside of the custom housing. Suspension mounts may be provided to the outside of the custom housing top eliminate "clutter" on the bottom of the vehicle and reduce the exposed areas for blast. This promotes a "clean" profile of the underside of the vehicle, further enhancing blast mitigation.

The custom housing is made of a material such that it promotes shielding, drive train housing and vehicle body stiffening. The shape and connection to the bottom of the vehicle is such that it cooperates with and compliments the blast mitigating shape of the vehicle hull section to reduce blast energy transmitted to the vehicle.

BRIEF DESCRIPTION OF THE DRAWINGS

FIG. 6 is a side view of one embodiment of the differential housing of the present disclosure.

DETAILED DESCRIPTION

Figure 1:
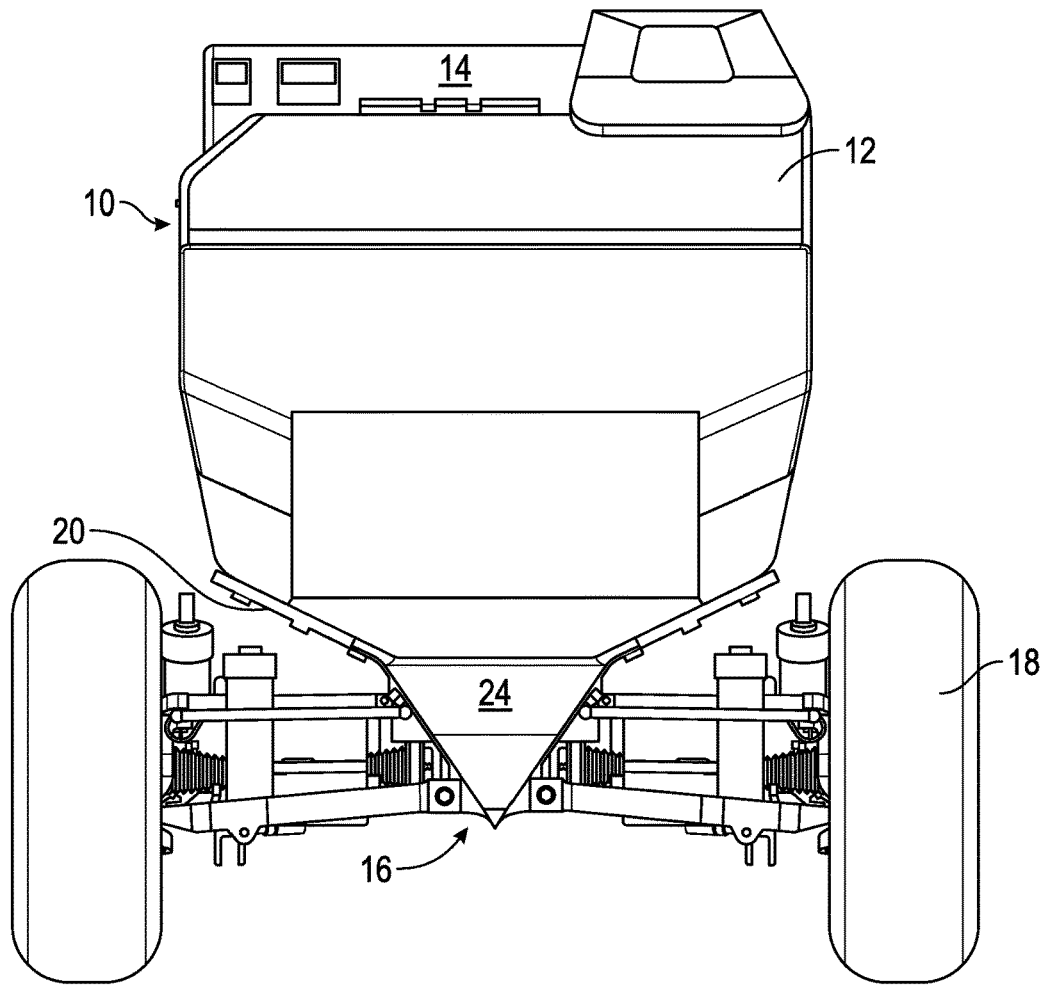
FIG. 1 is a front view of an armored vehicle with a blast deflecting hull.

Turning now to the drawings wherein like numbers refer to like structures, FIG. 1 is a front view representation of one embodiment of an armored vehicle 10 with a blast mitigating hull design according to one aspect of the present disclosure. The armored vehicle 10 has a body 12, with an occupant compartment 14, and underside 16. While steered wheels 18 are shown, it is understood that the exemplary blast mitigating differential housing 24 may be fit on other types of vehicles, such as vehicles with tracks. The underside 16 may have an underbelly kit 20 that may be coupled with the body 12 of armored vehicle 10. The underbelly kit 20 may be configured to add stiffness to the body 12 of armored vehicle 10.

Figure 5:
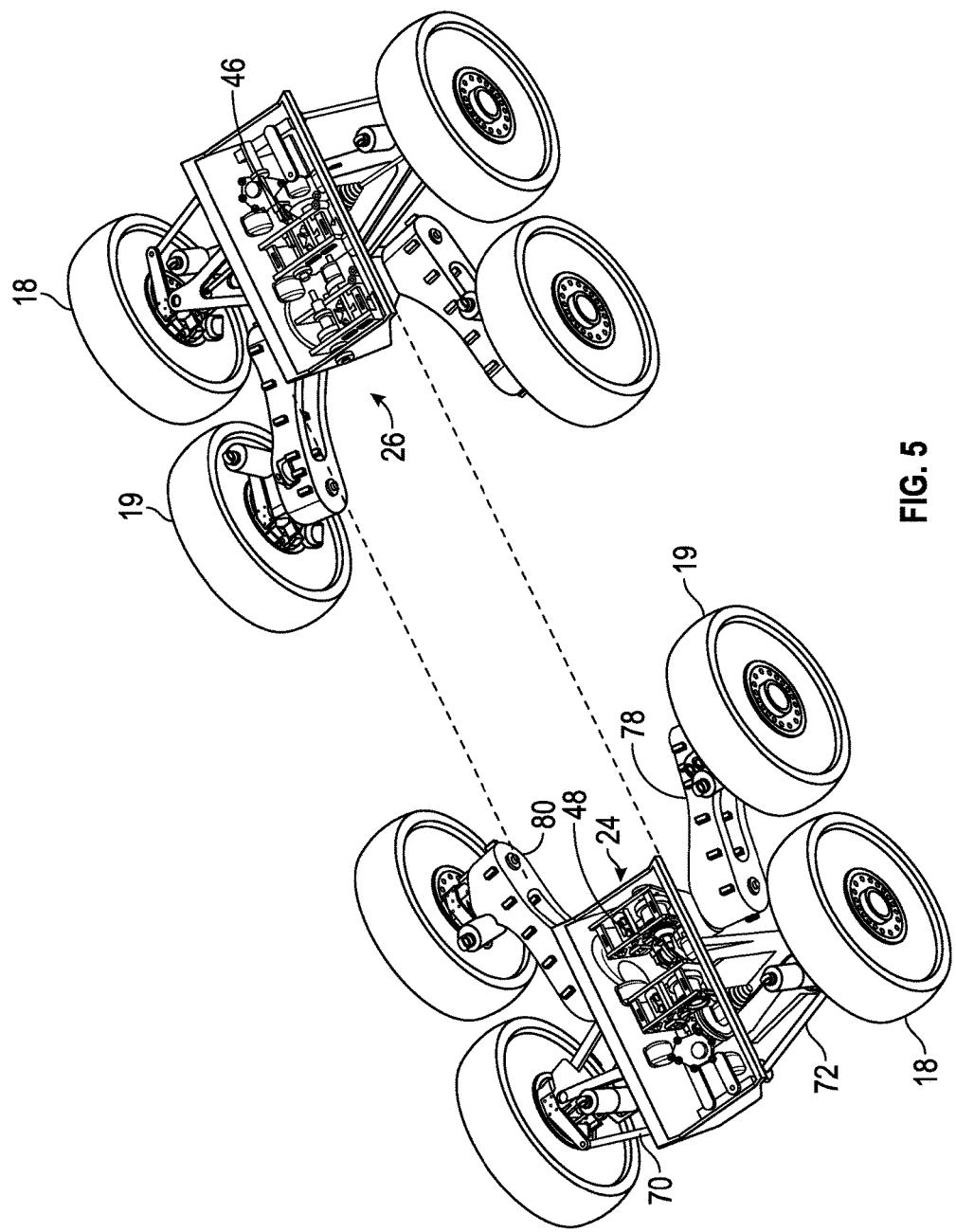
FIG. 5 is a schematic representation of the underside of an eight-wheeled armored vehicle having two exemplary blast mitigating differential housings, and showing a clean underbody space with no components or obstructions.

Differential housing 24 protects the armored vehicle's differentials 46 and is integral with the armored vehicle's suspension system 68, steering elements, and drivetrain. Side walls 30 and 32 of differential housing 24 may be coupled with the underbelly kit 20 (or other adapter plates) as shown in FIG. 1, or may be coupled directly on the body 12 of the armored vehicle. Blast mitigating differential housing 24 may be made of numerous materials, including but not limited to ballistic, armored, steel, specialized steel, aluminum, and composite material. When describing the blast mitigating differentials housing, only one will be described in detail but it is understood that an armored vehicle 10 may have two or more blast mitigating differential housings and that each such housing is substantially similar to the differential housing described with the regard to the following Figures. For example, FIG. 5 illustrates two differential housings 24 and 26 for an eight-wheeled vehicle. Moreover, more than one differential 46 may be protected within one differential housing unit.

Figure 2:
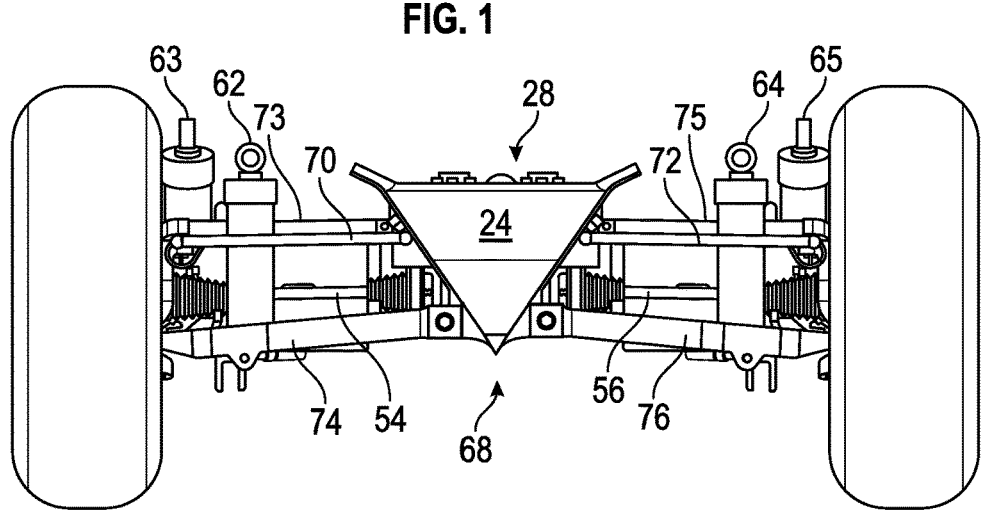
FIG. 2 is a front view of a differential housing of one embodiment of the present disclosure.

Turning now to FIG. 2, there is shown a representation of one configuration of a blast mitigating differential housing 24 according to one aspect of the present disclosure. Differential housing 24 is illustrated protecting a differential 46 of armored vehicle 10. The differential housing 24 is integral with the vehicle's drivetrain, suspension, and steering elements. Drive shafts 54 and 56, which are the outputs (or output elements) of differential 46, are shown extending laterally from differential housing 24 toward steered wheels 18. Drive shaft apertures 58 and 60 permit drive shafts 54 and 56 to extend through differential housing 24 and engage differential 46. Lower control arms 74 and 76 and upper control arms 73 and 75 may be mounted to the exterior of differential housing 24 and may extend laterally outward from differential housing 24 toward steered wheels 18. Likewise, steering links 70 and 72 may be attached to the exterior of differential housing 24 and may extend laterally outward from differential housing 24 toward steered wheels 18. Shock absorbers 62 and 64 may function to dampen the vibration experienced by armored vehicle 10 when the vehicle is traveling over rough terrain. Non-steered wheel shock absorbers 63 and 65 may dampen vibration experienced by non-steered wheels 19.

Figure 3:
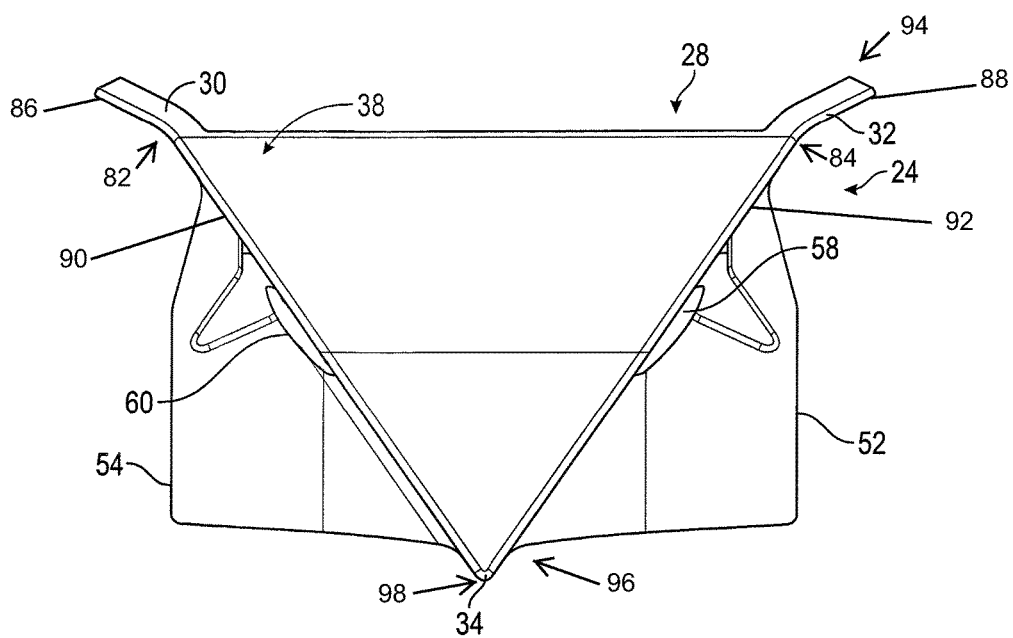
FIG. 3 is a side view of the differential housing of FIG. 2 showing a detailed view of its V shape.
Figure 4:
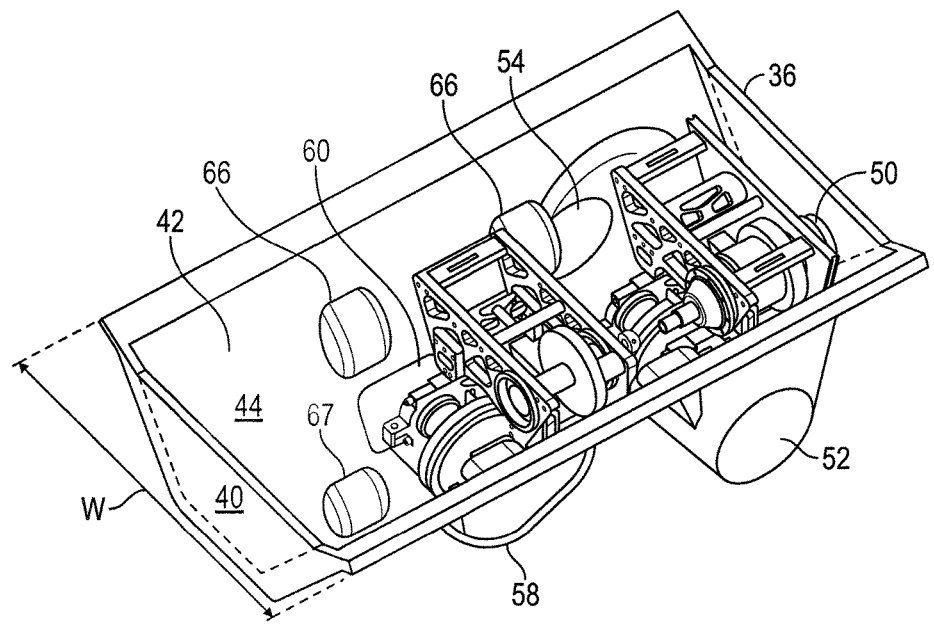
FIG. 4 is a perspective top view of an exemplary differential housing with COTS differential components mounted therein.

Referring now to FIGS. 3, 4, and 6, the differential housing 24 is illustrated having a "V" shape 28. Side walls 30 and 32 are configured to meet at their bottom portions 96. In FIG. 3, the side walls 30 and 32 meet at an apex 34 to form a V shape 28. The side walls 30 and 32 may be separated by first wall 36 at a first end 38, and by a second wall 40 at an opposed second end 22. It can therefore be seen that the blast mitigating differential housing 24 has a length "L" and a width "W" and is closed along the housing underside 43 to define a cavity 42. The interior 44 or inner space of differential housing 24 may house a plurality of differentials 46. At the top portions 94 of the side walls 30 and 32, there is shown extending portions 86 and 88 of the side walls that allow for mounting of the differential housing to a structure, such as the body 12 of armored vehicle 10. The extended portions 86 and 88 of the side walls 30 and 32 may form a radius with the main portions 90 and 92 of the side walls 30 and 32 such that blast energy may not accumulate at a sharp angle. The radiused portions 82 and 84 between the extending portions 86 and 88 and the main portions 90 and 92 of the side walls 30 and 32 assist in the deflection of blast energy.

While a V shape 28 is shown in the Figures as part of the exemplary embodiments disclosed, it is understood that variations of the V shape 28 may be possible. For example, the side walls 30 and 32 may contain certain portions that jet out to accommodate a more robust differential. Additionally, a U shape or like shapes may be employed. The differential housing 24 may assume any shape consistent with the shape of an armored vehicle's underside so as to function cooperatively with the vehicle underside 16. It is important to note that it is preferable that the side walls 30 and 32 generally decline from a top portion 94 of the side walls to a bottom portion 96 of the sides walls and toward one another to meet at a base portion 98. The base portion 98 could be flat, such as the flat portion of a U shape, or it could be an apex 34, such as the pointed base portion 98 of a V shape. Generally declining side walls 30 and 32 could account for side walls that are stepped or that have noncontiguous declined portions. In viewing FIGS. 1 through 3, it can be seen that the bottom portion 96 of the differential housing 24 is generally narrower than the top portion 94 so that the housing may deflect blast energy. However, it should be noted that deviation from the exemplary V shape 28 of the differential housing 24 may reduce the differential housing's blast mitigating abilities. Specifically, flat surfaces allow blast energy to accumulate and thus a vehicle having a non-V shaped housing may absorb more blast energy than a vehicle having a V shaped 28 differential housing 24.

Referring now to FIG. 4, the differential housing 24 may be equipped with drive shaft apertures 58 and 60 on side walls 30 and 32 that provide openings for drive shafts 54 and 56 to engage a differential 48 and extend laterally toward steered wheels 18. Differential housing 24 may also have additional apertures. Road arm apertures 52 and 54 provide openings in side walls 30 and 32 to accommodate road arms 78 and 80. As shown in FIG. 5, road arm apertures 52 and 54 may permit additional drive shafts to engage a differential 48 within a differential housing 24. Road arms 78 and 80 may be coupled with the additional drive shafts to control and support non-steered wheels 19. Where multiple drive shafts and/or axles are powered by the differential within the differential housing 24, it is understood that multiple apertures may be made in the side walls 30 and 32 to accommodate such vehicle drive shafts and/or axles.

In one embodiment, differential housing 24 may include first wall 36 and second wall 40 to substantially enclose the differential housing 24 as shown in FIG. 4. Additionally, a top or ceiling (not shown) may completely enclose the differential housing 24, and along with sealing elements (not shown), may make differential housing 24 liquid tight (i.e., no liquids are permitted to enter or exit the housing). Oil or other lubricating elements may fill the housing to lubricate and cool the differentials 46.

Alternatively, in another embodiment, differential housing 24 may have first wall 36 and second wall 40 removed, as shown by the dashed lines in FIG. 4 on first wall 36 and second wall 40. In this configuration, each differential 46 and 48 may be a self-contained unit, supplying its own lubrication, cooling mechanisms, etc.

FIG. 5 is a schematic representation of the underside of a vehicle with two blast mitigating differential housings 24 and 26. As shown therein, each differential housing 24 and 26 has two differentials 46 mounted therein. It is readily apparent that the blast mitigating differential housings 24, 26 are modular in construction, such that multiple differential housing structures can be used for a vehicle, and further, it is apparent that the underside 16 of the vehicle 10 is thereby provided with a maximum "clean" (i.e., uncrowded" underbody space with no components or obstructions to provide an area where a blast force may damage the vehicle or injure the occupants.

Referring now to FIG. 6, it must be noted that differential housings 24, 26 may be configured to have a differential input aperture 50 (input differential element) in first wall 36 to accommodate a drive shaft, propeller shaft, or the like (not shown) to transfer engine rotational power to the differential(s) and thence to the steered wheels 18. Differential housing 24 comprises upper control arm mounts 66 and lower control arm mounts 67 that are integral with side walls 30 and 32 to accommodate mounting of the vehicle suspension system 68. Other mounting surfaces may be provided for the various steering elements on the exterior surface of the blast mitigating differential housing 24. The suspension system 68 may comprise upper control arms 73 and 75 and lower control arms 74 and 76, as seen in FIG. 2. Placing the upper control arm mounts 66 and the lower control arm mounts 67 directly on the differential housing 24 reduces component crowding on the underside 16 of the vehicle 10, and utilizes the blast deflecting properties of the differential housing's design to reduce damage to the vehicle suspension system 68. In addition, the mountings 66 and 67 on the exterior surfaces of the differential housing 24 greatly simplifies servicing of the vehicle 10 in the event of blast damage, inasmuch as the differential housing 24 doesn't have to be removed in order to service the suspension. Rather, the suspension is attached directly to the differential housing 24, which results in the aforementioned benefits of reduced clutter and ease of service.

FIG. 6 also illustrates the side profile of an exemplary blast mitigating housing 24. Note that the opposed second end 22 has a ramp portion 41 that connects the second wall 40 with the differential housing underside 43. Ramp portion 41 provides additional ground and obstacle clearance. Ramp portion 41 also reduces the weight of the differential housing 24 and makes it more compact.

While one aspect of the disclosure has been described, it is apparent to those skilled in the art that many variations and modifications are possible without departing from the scope and sprit of the invention as set for within the appended claims.

What is claimed as new and desired to be protected by Letters Patent of the United States is:

1. A vehicle having a blast mitigating structure, comprising:
    a housing mounted on an underside of the vehicle, the housing having side walls that are sloped downwardly and toward each other;
    wherein the side walls that are sloped downwardly and toward each other form a cavity;
    a differential contained at least partially within the cavity formed by the side walls that are sloped downwardly;
    at least one drive shaft extending from the differential in a direction substantially perpendicular to the length of the housing, the at least one drive shaft extending through one of the side walls that are sloped downwardly and toward each other.

2. The vehicle of claim 1, wherein said vehicle is a wheeled, tracked, amphibious, or air vehicle.

3. A vehicle having a blast mitigating structure, comprising:
    a housing mounted on an underside of the vehicle and surrounding a differential, the housing having side walls that are sloped downwardly and toward each other, and the housing having a plurality of apertures to accommodate an input to the differential and outputs from the differential to wheels of the vehicle;
    wherein the side walls converge to form a V-shape having an apex;
    wherein the side walls that are sloped downwardly and toward each other form a cavity;
    wherein the cavity is configured to contain a differential for the vehicle;
    at least one opening formed within at least one of the side walls that are sloped downwardly, the opening configured to accommodate at least one drive shaft extending from the differential of the vehicle.

4. The vehicle of claim 3, wherein said vehicle is a wheeled, tracked, amphibious, or air vehicle.

5. A vehicle having a blast mitigating structure, comprising:
    a housing mounted on an underside of the vehicle and at least partially surrounding a differential, the housing having side walls that are sloped downwardly and toward each other, and which converge to form a V-shape having an apex;
    wherein the side walls that are sloped downwardly and toward each other form a cavity;
    wherein the cavity is configured to contain a differential for a vehicle;
    at least one opening formed within at least one of the side walls that are sloped downwardly, the opening configured to accommodate at least one drive shaft extending from the differential.

6. The vehicle of claim 5, wherein said vehicle is a wheeled, tracked, amphibious, or air vehicle.

\* \* \* \* \*